United States Patent [19]

Williams et al.

[11] Patent Number: 5,121,688
[45] Date of Patent: Jun. 16, 1992

[54] SPARK-DISCHARGE RECORDING HEAD WITH POSITION SENSOR AND CONTROL FOR IMAGING LITHOGRAPHIC PRINTING PLATES

[75] Inventors: Richard A. Williams, Hampstead; John P. Gardiner, Londonderry; Harry Roberts, Merrimack, all of N.H.

[73] Assignee: Presstek, Inc., Hudson, N.H.

[21] Appl. No.: 553,817

[22] Filed: Jul. 17, 1990

Related U.S. Application Data

[60] Continuation-in-part of Ser. No. 413,172, Sep. 27, 1989, Pat. No. 5,005,479, which is a division of Ser. No. 234,475, Aug. 19, 1988, Pat. No. 4,911,075.

[51] Int. Cl.⁵ .................. B41C 1/05; B41C 1/10; G01B 13/12
[52] U.S. Cl. .................. 101/142; 101/467; 73/37.5; 346/162; 400/59
[58] Field of Search .......... 346/162, 163, 164, 139 C, 346/33 S; 400/55, 59; 369/44.22; 360/75, 102, 103; 101/467; 73/37.5, 1 J

[56] References Cited

U.S. PATENT DOCUMENTS

| | | | |
|---|---|---|---|
| 2,905,768 | 9/1959 | Cronquist | 360/103 |
| 3,041,612 | 6/1962 | Woodcock | 360/103 X |
| 3,545,256 | 12/1970 | Beeken | 73/37.5 |
| 3,678,852 | 7/1972 | Feinleib et al. | 101/465 |
| 4,088,215 | 5/1978 | Bader | 346/139 C X |
| 4,124,854 | 11/1978 | Kirtikar | 346/139 C X |
| 4,438,444 | 3/1984 | Komada et al. | 346/155 |
| 4,448,867 | 5/1984 | Ohkubo et al. | 346/157 X |
| 4,676,675 | 6/1987 | Suzuki et al. | 400/59 X |
| 4,718,340 | 1/1988 | Love, III | 101/467 X |
| 4,729,310 | 3/1988 | Love, III | 101/466 X |
| 4,731,622 | 3/1988 | Hicks et al. | 346/157 |
| 4,751,659 | 6/1988 | Hecht | 346/154 X |
| 4,775,869 | 10/1988 | Minowa | 346/76 |
| 4,829,326 | 5/1989 | Emmett et al. | 346/157 |
| 4,911,075 | 3/1990 | Lewis et al. | 101/453 |

FOREIGN PATENT DOCUMENTS

| | | |
|---|---|---|
| 671744 | 10/1963 | Canada. |
| 0130028 | 1/1985 | European Pat. Off. ........... 101/467 |

*Primary Examiner*—Clifford D. Crowder
*Attorney, Agent, or Firm*—Cesari and McKenna

[57] ABSTRACT

An imaging head for use in a spark-discharge recording apparatus, including a tracking system for monitoring and maintaining the head a fixed distance away from the surface of a recording blank. The tracking system preferably measures the distance between the head and the surface of the blank using a gas source oriented toward the blank's surface and a pressure sensor for measuring the pressure of the gas reflected therefrom. The signal produced by the pressure sensor indicates the size of the gap. The pressue sensor is coupled to a servo system that alters the position of the head to maintain a preselected gap distance.

3 Claims, 7 Drawing Sheets

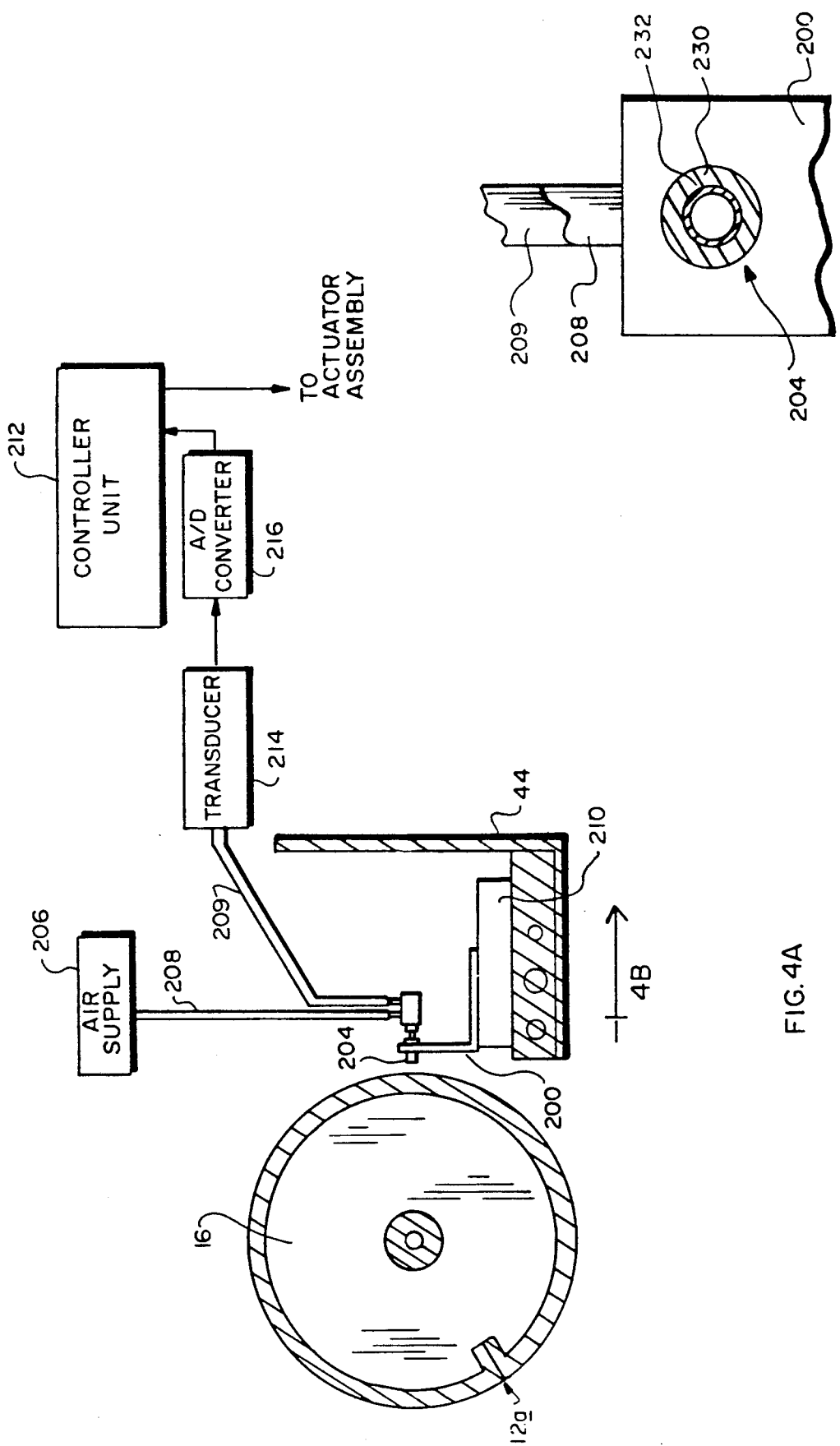

SPARK-DISCHARGE RECORDING HEAD WITH POSITION SENSOR AND CONTROL FOR IMAGING LITHOGRAPHIC PRINTING PLATES

RELATED APPLICATION

This application is a continuation-in-part of U.S. Ser. No. 413,172, now U.S. Pat. No. 5,005,479, which is a division of Ser. No. 234,475, now U.S. Pat. No. 4,911,075.

The present invention relates to offset lithography. It relates more specifically to apparatus for imaging lithographic plates using spark-discharge recording means.

BACKGROUND OF THE INVENTION

There are a variety of known ways to print hard copy in black and white and in color. Traditional techniques include letterpress printing, rotogravure printing and offset printing. These conventional printing processes produce high quality copies. However, when only a limited number of copies are required, the copies are relatively expensive. In the case of letterpress and gravure printing, the major expense results from the fact that the image must be cut or etched into the plate using expensive photographic masking and chemical etching techniques. Plates are also required in offset lithography. However, the plates are in the form of mats or films that are relatively inexpensive to make. The image is present on the plate or mat as hydrophilic (water-receptive) and hydrophobic (water-repellent) surface areas; hydrophobic areas are generally oleophilic, or ink-receptive, as well. In wet lithography, water and then ink are applied to the surface of the plate. Water tends to adhere to the hydrophilic or water-receptive areas of the plate, creating a thin film of water thereon which does not accept ink. The ink does adhere to the hydrophobic areas of the plate and those inked areas, usually corresponding to the printed areas of the original document, are transferred to a relatively soft blanket cylinder and, from there, to the paper or other recording medium brought into contact with the surface of the blanket cylinder by an impression cylinder.

Most conventional offset plates are also produced photographically. In a typical negative-working, subtractive process, the original document is photographed to produce a photographic negative. The negative is placed on an aluminum plate having a water-receptive oxide surface that is coated with a photopolymer. Upon being exposed to light through the negative, the areas of the coating that received light (corresponding to the dark or printed areas of the original) cure to a durable oleophilic state. The plate is then subjected to a developing process which removes the noncured areas of the coating that did not receive light (corresponding to the light or background areas of the original). The resultant plate now carries a positive or direct image of the original document.

If a press is to print in more than one color, a separate printing plate corresponding to each color is required, each of which is usually made photographically as aforesaid. In addition to preparing the appropriate plates for the different colors, the plates must be mounted properly on the plate cylinders in the press and the angular positions of the cylinders coordinated so that the color components printed by the different cylinders will be in register on the printed copies.

The development of lasers has simplified the production of lithographic plates to some extent. Instead of applying the original image photographically to the photoresist-coated printing plate as above, an original document or picture is scanned line-by-line by an optical scanner which develops strings of picture signals, one for each color. These signals are then used to control a laser plotter that writes on and thus exposes the photoresist coating on the lithographic plate to cure the coating in those areas which receive light. That plate is then developed in the usual way by removing the unexposed areas of the coating to create a direct image on the plate for that color. Thus, it is still necessary to chemically etch each plate in order to create an image on that plate.

There have been some attempts to use more powerful lasers to write images on lithographic plates by volatilizing the surface coating so as to avoid the need for subsequent developing. However, the use of such lasers for this purpose has not been entirely satisfactory because the coating on the plate must be compatible with the particular laser; this requirement limits the choice of coating materials. Also, the pulsing frequencies of some lasers used for this purpose are so low that the time required to produce a halftone image on the plate is unacceptably long.

There have also been some attempts to use scanning E-beam apparatus to etch away the surface coatings on plates used for printing. However, such machines are very expensive. In addition, they require that the workpiece, i.e. the plate, be maintained in a complete vacuum, making such apparatus impractical for day-to-day use in a printing facility.

Images have also been applied to a lithographic plate by electroerosion. A type of plate suitable for imaging in this fashion, and disclosed in U.S. Pat. No. 4,596,733, has an oleophilic plastic substrate, e.g. Mylar brand plastic film, having a thin coating of aluminum metal with an overcoating that contains conductive graphite; the coating acts as a lubricant and protects the aluminum layer against scratching. A stylus electrode in contact with the graphite-containing surface coating is caused to move across the surface of the plate and is pulsed in accordance with incoming picture signals. The resultant current flow between the electrode and the thin metal coating is by design large enough to erode away the thin metal coating and the overlying conductive graphite containing surface coating, thereby exposing the underlying ink receptive plastic substrate on the areas of the plate corresponding to the printed portions of the original document. This method of making lithographic plates is disadvantaged in that the described electroerosion process only works on plates whose conductive surface coatings are very thin; moreover, the stylus electrode which contacts the surface of the plate sometimes scratches the plate. This degrades the image being written onto the plate because the scratches constitute inadvertent or unwanted image areas on the plate which print unwanted marks on the copies.

Finally, we are aware of a press system which images a lithographic plate while the plate is actually mounted on the plate cylinder in the press. The cylindrical surface of the plate, treated to render it either oleophilic or hydrophilic, is written on by an ink jetter arranged to scan over the surface of the plate. The ink jetter is controlled so as to deposit on the plate surface a thermoplastic image-forming resin or material which has a desired affinity for the printing ink being used to print the copies. For example, the image-forming material may be attractive to the printing ink so that the ink adheres to the plate in the areas thereof where the image-forming material is present, and resistant to the "wash" used in the press to prevent inking of the background areas of the image on the plate.

While that prior system may be satisfactory for some applications, it is not always possible to provide thermoplastic image-forming material that is suitable for jetting and that also has the desired affinity for all of the inks commonly used for making lithographic copies. Also, ink jet printers are generally unable to produce small enough ink dots to allow the production of smooth continuous tones on the printed copies; in other words, the resolution is not high enough.

Thus, in spite of all the aforesaid efforts to improve different aspects of lithographic plate production and offset printing, these efforts have not reached full fruition primarily because of the limited number of different plate constructions available and the limited number of different techniques for practically and economically imaging those known plates. Accordingly, it would be highly desirable if new and different lithographic plates became available which could be imaged by writing apparatus able to respond to incoming data, so as to apply a positive or negative image directly to the plate in a manner that avoids the need for subsequent processing of the plate to develop or fix that image.

SUMMARY OF THE INVENTION

The invention comprises an article of manufacture possessing the features and properties exemplified in the constructions described herein, and the several steps and the relation of one or more of such steps with respect to the others, and the apparatus embodying the features of construction, combination of elements and the arrangement of parts which are adapted to effect such steps, all as exemplified in the following detailed description, and the scope of the invention will be indicated in the claims.

In accordance with the present invention, images are applied to a lithographic printing plate by altering the plate surface characteristics at selected points or areas of the plate using a non-contacting writing head, which scans over the surface of the plate and is controlled by incoming picture signals corresponding to the original document or picture being copied. The writing head utilizes a precisely positioned high-voltage spark discharge electrode to create on the surface of the plate an intense-heat spark zone, as well as a corona zone in a circular region surrounding the spark zone. In response to the incoming picture signals and ancillary data (such as dot size, screen angle, screen mesh, etc.) keyed in by the operator and merged with the picture signals, high-voltage pulses having precisely controlled voltage and current profiles are applied to the electrode to produce precisely positioned and defined spark/corona discharges to the plate which etch, erode or otherwise transform selected points or areas of the plate surface, rendering them either receptive or non-receptive to the printing ink that will be applied to the plate to make the printed copies.

Lithographic plates are made ink-receptive or oleophilic initially by providing them with surface areas consisting of unoxidized metals or plastic materials to which oil and rubber-based inks adhere readily. On the other hand, plates are made water-receptive or hydrophilic initially in any of three ways. One plate embodiment is provided with a plated metal surface, e.g. of chrome, whose topography or character is such that it is wetted by surface tension. A second plate has a surface consisting of a metal oxide, e.g. aluminum oxide, which hydrates with water. The third plate construction is provided with a polar plastic surface which is also roughened to render it hydrophilic.

The present apparatus can write images on all of these different lithographic plates, regardless of whether the surface is ink-receptive or water-receptive. In other words, if the plate surface is hydrophilic initially, our apparatus will write a positive or direct image on the plate by rendering oleophilic the points or areas of the plate corresponding to the printed portion of the original document. On the other hand, if the plate surface is oleophilic initially, the apparatus will apply a background or negative image to the plate surface by rendering hydrophilic or oleophobic the points or areas corresponding to the background or non-printed portion of the original document. Because most documents have less printed area than non-printed area, direct or positive writing is usually preferred in order to minimize the amount of plate surface area that must be written on or converted.

The plate imaging apparatus incorporating our invention is preferably implemented as a scanner or plotter comprising a writing head that consists of one or more spark discharge electrodes. The electrode (or electrodes) is (or are) positioned over the working surface of the lithographic plate and moved relative to the plate so as to collectively scan the plate surface. Each electrode is controlled by an incoming stream of picture signals, which electronically represent an original document or picture. The signals can originate from any suitable source such as an optical scanner, a disk or tape reader, a computer, etc. These signals are formatted so that the apparatus's spark discharge electrode or electrodes write a positive or negative image onto the surface of the lithographic plate that corresponds to the original document.

If the lithographic plates being imaged by our apparatus are flat, then the spark-discharge electrode or electrodes may be incorporated into a flat bed scanner or plotter. Usually, however, such plates are designed to be mounted to a plate cylinder. Accordingly, for most applications, the spark-discharge writing head is incorporated into a so-called drum scanner or plotter, with the lithographic plate being mounted to the cylindrical surface of the drum. Actually, as we shall show, our invention can be practiced on a lithographic plate already mounted in a press to apply an image to that plate in situ. In this application, then, the plate cylinder itself constitutes the drum component of the scanner or plotter.

To achieve the requisite relative motion between the spark discharge writing head and the cylindrical plate, the plate can be rotated about its axis and the head moved parallel to the rotation axis so that the plate is scanned circumferentially, with the image on the plate "growing" in the axial direction. Alternatively, the writing head can move parallel to the drum axis and the drum incremented angularly after each pass of the head, so that the image on the plate grows circumferentially. In both cases, after a complete scan by the head, an image corresponding to the original document or picture will have been applied to the surface of the printing plate.

As each electrode traverses the plate, it is maintained at a very small fixed distance above the plate surface and cannot scratch that surface. In response to the incoming picture signals, which usually represent a halftone or screened image, each electrode is pulsed or not pulsed at. selected points in the scan depending upon whether, according to the incoming data, the electrode is to write or not write at these locations. Each time the electrode is pulsed, a high-voltage spark discharge occurs between the electrode tip and the particular point on the plate opposite the tip. The heat from that spark discharge and the accompanying corona field surrounding the spark etches or otherwise transforms the surface of the plate in a controllable fashion to produce an image-forming spot or dot on the plate surface. This dot is precisely defined in terms of shape and depth of penetration into the plate.

Preferably, the tip of each electrode is pointed to obtain close control over the definition of the spot on the plate that is affected by the spark discharge from that electrode. Indeed, the pulse duration, current or voltage controlling the discharge may be varied to produce a variable dot on the plate. Also, the polarity of the voltage applied to the electrode may be made positive or negative depending upon the nature of the plate surface to be affected by the writing, that is, depending upon whether ions need to be pulled from or repelled to the surface of the plate at each image point in order to transform the surface at that point to distinguish it imagewise from the remainder of the plate surface (e.g., to render it oleophilic in the case of direct writing on a plate whose surface is hydrophilic). In this way, image spots can be written onto the plate surface that have diameters on the order of 0.005 inch all the way down to 0.0001 inch.

After a complete scan of the plate, then, the apparatus will have applied a complete screened image to the plate in the form of a multiplicity of surface spots or dots which differ in their affinity for ink from the portions of the plate surface not exposed to the spark discharges from the scanning electrode.

Thus, using our method and apparatus, high-quality images can be applied to our special lithographic plates which have a variety of different plate surfaces suitable for either dry or wet offset printing. In all cases, the image is applied to the plate relatively quickly and efficiently and in a precisely controlled manner so that the image on the plate accurately represents the printing on the original document. Using our technique, a lithographic plate can be imaged while it is mounted in its press, thereby reducing set-up time considerably. An even greater reduction in set-up time results if the invention is practiced on plates mounted in a multi-color press, because correct color registration between the plates on the various plate cylinders can be accomplished electronically (rather than manually) by controlling the timings of the input data applied to the electrodes that control the writing of the images on the corresponding plates. As a consequence of the foregoing combination of features, our method and apparatus for applying images to lithographic plates and the plates, themselves should receive wide acceptance in the printing industry.

BRIEF DESCRIPTION OF THE DRAWINGS

For a fuller understanding of the nature and objects of the invention, reference should be had to the following detailed description taken in connection with the accompanying drawings, in which:

FIG. 4A is a side schematic view of a sensor mechanism used to monitor the distance between the writing head and the plate to be imaged;

FIGS. 4B and 4C depict front and cutaway side views, respectively, of the sensor head;

DESCRIPTION OF THE PREFERRED EMBODIMENTS

Figure 1:
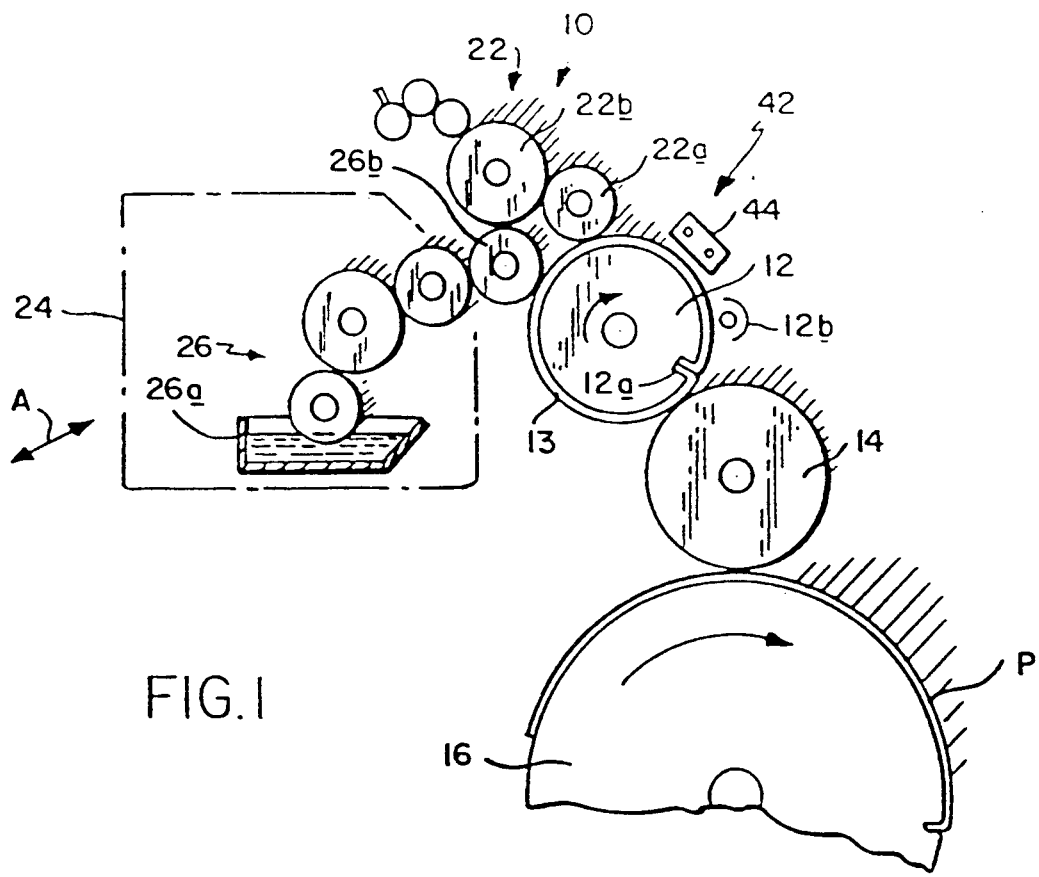
FIG. 1 is a partial diagrammatic view of an offset press incorporating a lithographic printing plate made in accordance with this invention.

Refer first to FIG. 1 of the drawings which shows a more or less conventional offset press shown generally at 10 which can print copies using lithographic plates made in accordance with this invention.

Press 10 includes a plate cylinder or drum 12 around which is wrapped a lithographic plate 13 whose opposite edge margins are secured to the plate by a conventional clamping mechanism 12a incorporated into cylinder 12. Cylinder 12, or more precisely the plate 13 thereon, contacts the surface of a blanket cylinder 14 which, in turn, rotates in contact with a large diameter impression cylinder 16. The paper sheet P to be printed on is mounted to the surface of cylinder 16 so that it passes through the nip between cylinders 14 and 16 before being discharged to the exit end of the press 10. Ink for inking plate 13 is delivered by an ink train 22, the lowermost roll 22a of which is in rolling engagement with plate 13 when press 10 is printing. As is customary in presses of this type, the various cylinders are all geared together so that they are driven in unison by a single drive motor.

The illustrated press 10 is capable of wet as well as dry printing. Accordingly, it includes a conventional dampening or water fountain assembly 24 which is movable toward and away from drum 12 in the directions indicated by arrow A in FIG. 1 between active and inactive positions. Assembly 24 includes a conventional water train shown generally at 26 which conveys water from a tray 26a to a roller 26b which, when the dampening assembly is active, is in rolling engagement with plate 13 and the intermediate roller 22b of ink train 22 as shown in phantom in FIG. 1.

When press 10 is operating in its dry-printing mode, the dampening assembly 24 is inactive so that roller 26b is retracted from roller 22b and thus from the plate 13, as shown in solid lines in FIG. 1, and no water is applied to the plate. The lithographic plate on cylinder 12 in this case is designed for such dry printing. It has a surface that is oleophobic or non-receptive to ink, except in those areas that have been written on or imaged to make them oleophilic. As the cylinder 12 rotates, the plate is contacted by the ink-coated roller 22a of ink train 22. The areas of the plate surface that have been written on and thus made oleophilic pick up ink from roller 22a. Those areas of the plate surface not written on receive no ink. Thus, after one revolution of cylinder 12, the image written on the plate will have been inked or developed. That image is then transferred to the blanket cylinder 14, and finally to the paper sheet P which is pressed into contact with the blanket cylinder.

When press 10 is operating in its wet-printing mode, the dampening assembly 24 is active so that the water roller 26b contacts ink roller 22b and the surface of the plate 13 as shown in phantom in FIG. 1. In this case, plate 13 has a surface that is hydrophilic except in the areas thereof which have been written on to make them oleophilic. Those areas, which correspond to the printed areas of the original document, shun water. In this mode of operation, as the cylinder 12 rotates (clockwise in FIG. 1), water and ink are presented to the surface of plate 13 by the rollers 26b and 22a, respectively. The water adheres to the hydrophilic areas of that surface (which correspond to the background or non-image areas of the original document) and those areas, being coated with water, do not pick up ink from roller 22a. On the other hand, the oleophilic areas of the plate surface that have not been wetted by roller 26 pick up ink from roller 22a, again forming an inked image on the surface of the plate. As before, that image is transferred via blanket roller 14 to the paper sheet P on cylinder 16.

Figure 2:
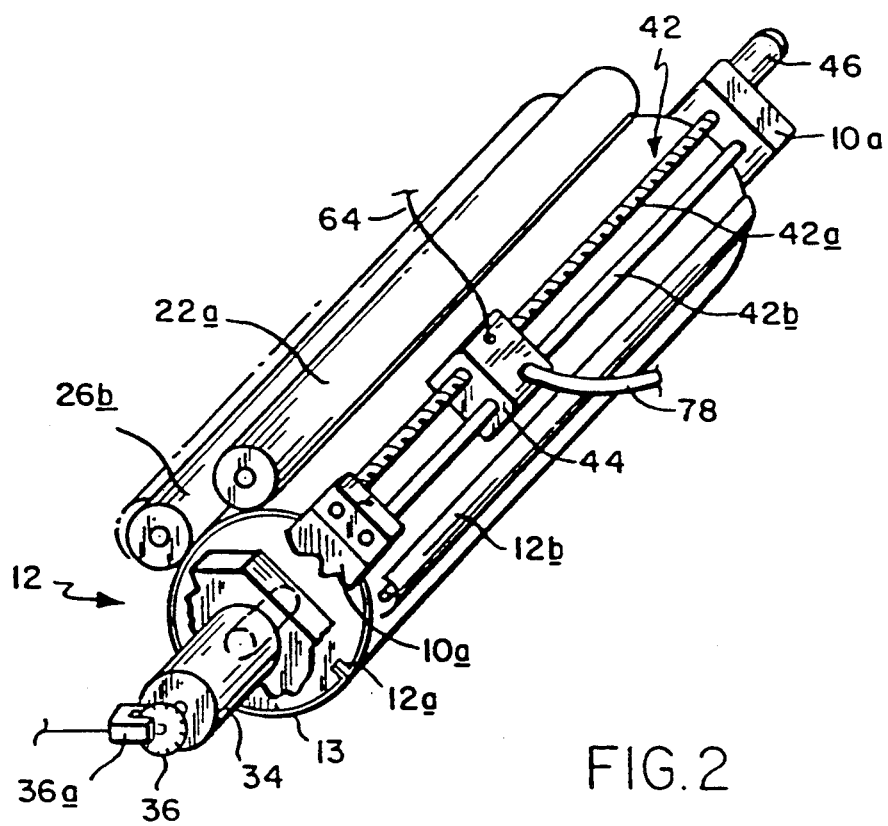
FIG. 2 is an isometric view on a larger scale showing in greater detail the plate cylinder portion of the FIG. 1 press.

While the image to be applied to the lithographic plate 13 can be written onto the plate while the plate is "off press", our invention lends itself to imaging the plate when the plate is mounted on the plate cylinder 12. The apparatus for accomplishing this will now be described with reference to FIG. 2. As shown in FIG. 2, the plate cylinder 12 is rotatably supported by the press frame 10a and rotated by a standard electric motor 34 or other conventional means. The angular position of cylinder 12 is monitored by conventional means such as a shaft encoder 36 and a detector 36a; the encoder 36 rotates with the motor armature.

Also supported on frame 10a adjacent to plate cylinder 12 is a writing head assembly shown generally at 42. This assembly comprises a lead screw 42a whose opposite ends are rotatably supported in the press frame 10a, which frame also supports the opposite ends of a guide bar 42b spaced parallel to lead screw 42a. Mounted for movement along the lead screw and guide bar is a carriage 44. When the lead screw is rotated by a stepper motor 46, carriage 44 is moved axially with respect to plate cylinder 12.

The cylinder drive motor 34 and stepper motor 46 are operated in synchronism by a controller 50 (shown in FIG. 3), which also receives signals from detector 36a so that, as the drum rotates, the carriage 44 moves axially along the drum with the controller "knowing" the instantaneous relative position of the carriage and cylinder at any given moment. The control circuitry required to accomplish this is already very well known in the scanner and plotter art.

Figure 3:
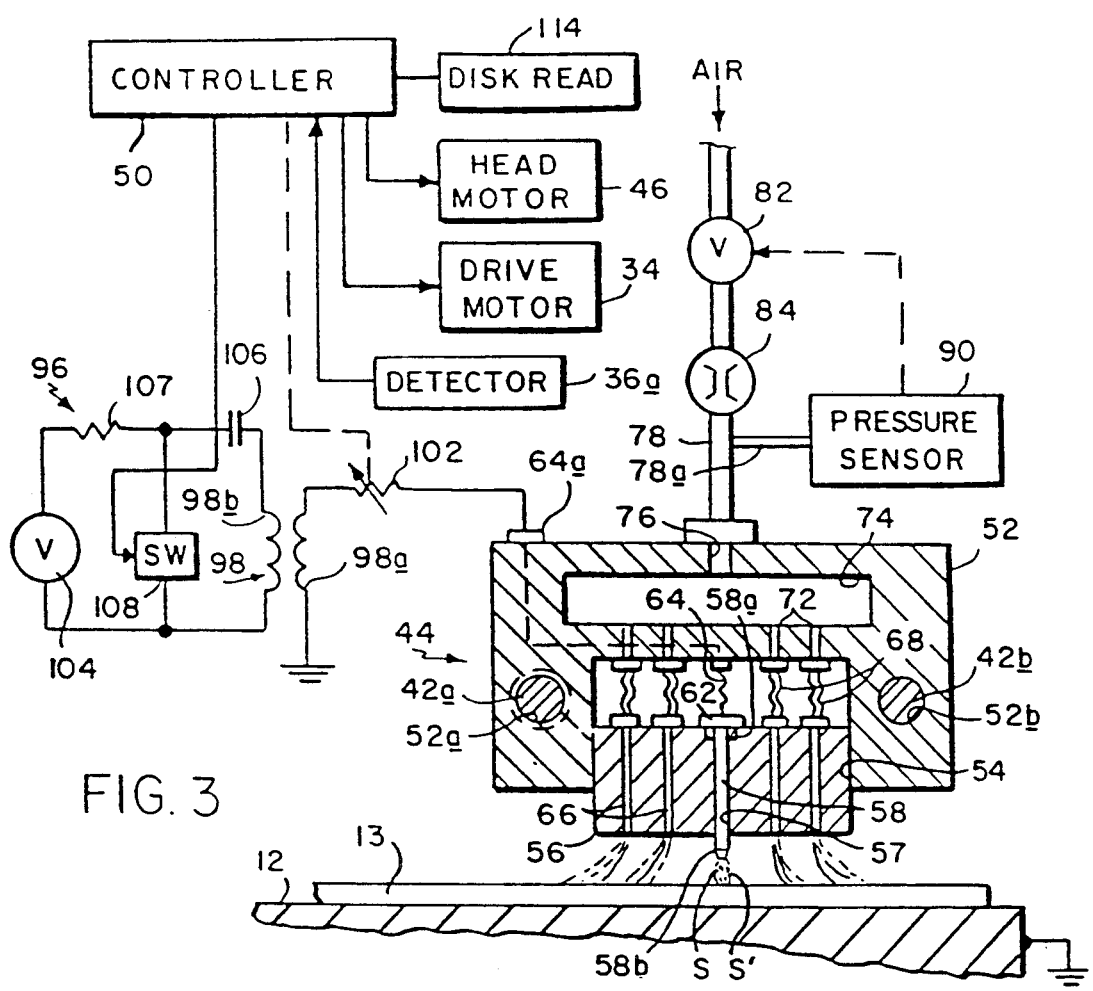
FIG. 3 is a sectional view taken along line 3—3 of FIG. 2 on a larger scale showing the writing head that applies an image to the surface of the plate cylinder of FIG. 2, with the associated electrical components being represented in a block diagram.

Refer now to FIG. 3 which depicts an illustrative embodiment of carriage 44. It includes a block 52 having a threaded opening 52a for threadably receiving the lead screw 42a and a second parallel opening 52b for slidably receiving the guide rod 42b. A bore or recess 54 extends in from the underside of block 52 for slidably receiving a writing head 56 made of a suitable rigid electrical insulating material. An axial passage 57 extends through head 56 for snugly receiving a wire electrode 58, the diameter of which has been exaggerated for clarity. The upper end 58a of the wire electrode is received and anchored in a socket 62 mounted to the top of head 56 and the lower end 58b of the electrode 58 is preferably pointed as shown in FIG. 3. Electrode 58 is fabricated from electrically conductive metal or metals; alloys of tungsten or other refractory metal or compounds capable of withstanding very high temperatures are suitable. An insulated conductor 64 connects socket 62 to a terminal 64a at the top of block 52. If the carriage 44 has more than one electrode 58, similar connections are made to those electrodes so that a plurality of points on the plate 13 can be imaged simultaneously by assembly 42.

The tip 58b of the needle electrode 58 is maintained at a precisely controlled very small spacing, e.g. 0.001 to 0.005 inch above the surface of plate 13, and should be maintained within a band of 0.0004 inches as the carriage 44 scans along the surface of the plate. Design of a suitable tracking system to maintain this critical spacing in the environment of the present invention presents a number of engineering difficulties. The system must respond quickly to changing plate surface features so as not to reduce the writing speed of the pulsing electrode. Furthermore, accuracy cannot be compromised because an excessive distance between tip 58b and plate surface 13 (hereinafter, the "etch gap") results in degraded image quality, while actual contact therebetween can cause physical damage both to tip 58b and plate surface 13.

Furthermore, the area proximate to electrode 58 presents an environment that is both electrically noisy and permeated by airborne particles during imaging, thus preventing the tracking system from depending on "clean" electrical signals or a dust-free atmosphere for operation. Airborne particles additionally preclude use of tracking systems based on optical devices. Finally, the system should retain sensitivity across a wide variety of plate materials, some of which may present special magnetic characteristics that can affect electrical measurements.

We have developed a tracking system for use with the present invention that meets the foregoing criteria. Briefly, our system utilizes a pneumatic distance sensor and an electromechanical positioning mechanism, together with appropriate control circuitry, to make constant fine adjustments to the position of writing head 56 and thereby maintain a constant etch gap. In our preferred embodiment, a pneumatic sensor head discharges air under pressure onto the close-proximity plate surface, and the air reflected from this surface is sensed by a pressure transducer via a sense port and converted into a voltage signal. Because the magnitude of the reflected pressure signal varies inversely (and preferably linearly) with the distance of the pressure source, the source-to-plate distance is readily calculated without the need for physical contact.

It should be understood, however, that numerous configurations fulfill our criteria for a suitable pneumatic position sensor. As discussed below, air can either be blown at the plate surface so as to produce a reflected response, or drawn directly into the sensor from the surrounding atmosphere. Furthermore, the measured parameter can be pressure (where a constant-flow gas supply is used) or flow rate (where a constant-pressure gas supply is used). In either case, a regulated gas supply is employed.

FIG. 4A is a schematic depiction of the preferred embodiment of our tracking system. The pneumatic sensing apparatus is mounted on a slide 200, which is itself affixed to carriage 44 (shown in FIG. 3). Writing head 56 (see FIG. 5) is positioned on slide 200 above, below or to either side of sensor head 204. Slide 200, along with the apparatus mounted thereon, is attached to base support 210.

In this embodiment, sensor head 204 is equipped both to deliver a regulated air flow that generates the measurement signal, and to sense the reflected pressure or airflow signal. The measurement pressure signal is emitted by sensor head 204, which is supplied with air by means of flexible tubing 208 connected to a regulated air supply 206. The resultant reflected pressure signal is coupled through tubing 209 and measured by a pressure transducer 214 whose output is digitized by analog-to-digital (A/D) converter 216 and supplied to a controller unit 212.

We have obtained good results using applied pressures of 1.0 to 2.5 psig at a constant flow rate of approximately 15 liters/minute. However, it should be understood that advantageous results could be obtained by using a gas other than air and with different pressure/flow rate combinations, as would be well within the skill of an ordinary practitioner to determine.

As noted above, it is not necessary for gas to be expelled from port 230; it can instead be drawn through port 230, with pressure transducer 214 then measuring the magnitude of the resultant vacuum.

In the following discussion, elements and steps related to the distance-sensing assembly are described in terms that assume use of the preferred configuration outlined above; however, it should be understood that all operative configurations are intended to be covered hereby, with such changes as are rendered necessary by alterations in design of the distance-sensing assembly. In particular, for ease of description, we will describe a constant-flow configuration for air supply 206, with the intention of implying correlative features and characteristics of a constant-pressure system. Thus, instead of measuring pressure as an indicator of distance, we derive distance from the airflow necessary to maintain a constant pressure.

Figure 4C:
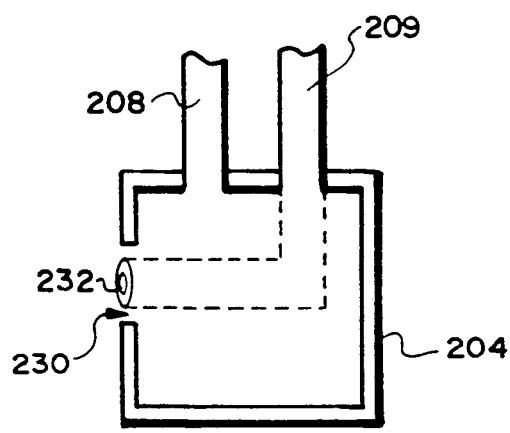

The construction of the preferred sensor head 204 is shown with greater particularity in FIGS. 4B and 4C, which depict front and side schematic views thereof. The measurement pressure signal, provided by air supply 206 through tubing 208, issues from sensor head 204 through an annular port 230. The resultant pressure at port 232, which occupies the center of port 230, propagates along the interior of flexible tubing 209 to a pressure transducer 214. Pressure transducer 214 converts the sensed pressure into an electrical signal that is directly related to the magnitude of the pressure at transducer 214, which pressure, in turn, is a function of the pressure at port 230. Transducer 214 thus generates an electrical signal that is responsive to the pressure that prevails at the orifice.

This electrical signal is transferred to an A/D converter 216, which applies a digitized representation thereof to controller unit 212, described below; controller unit 212 performs the processing and evaluation tasks that determine whether an adjustment to the etch gap is necessary. If so, it sends appropriate signals to the actuator assembly, which makes the necessary distance adjustment.

The dimensions of sensor head 204 are dictated by functional considerations. The sensor should provide accurate readings to at least 0.007 inch from plate surface 13. Response is related to distance as a single-valued function, preferably (although not necessarily) linearly in order to facilitate straightforward calculation. Furthermore, the slope of the response as a function of distance should be gradual in order to assure a sufficient working range. Small size is also desirable in order that the sensor head may be positioned close to writing head 56, thereby increasing the accuracy of distance measurements.

The annular orifice design is well-suited to achieving these objectives. Because annular port 230 emits a symmetrical sleeve of air, any pressure drop at port 232 caused by the emitted air will vary directly with distance to plate surface 13 over a greater range of distances than would be possible using alternative designs. The annular design is amenable to manufacture in small dimensions, allows the sensor to deliver a gradual response as a function of distance, and reduces measurement inaccuracies of irregular surface features. For example, we have advantageously employed a sensor produced by Festo Corp. of Hauppauge, N.Y., that provides an annular orifice of approximately 0.01 inch width in a sensor element 0.2 inch across.

Figure 5:
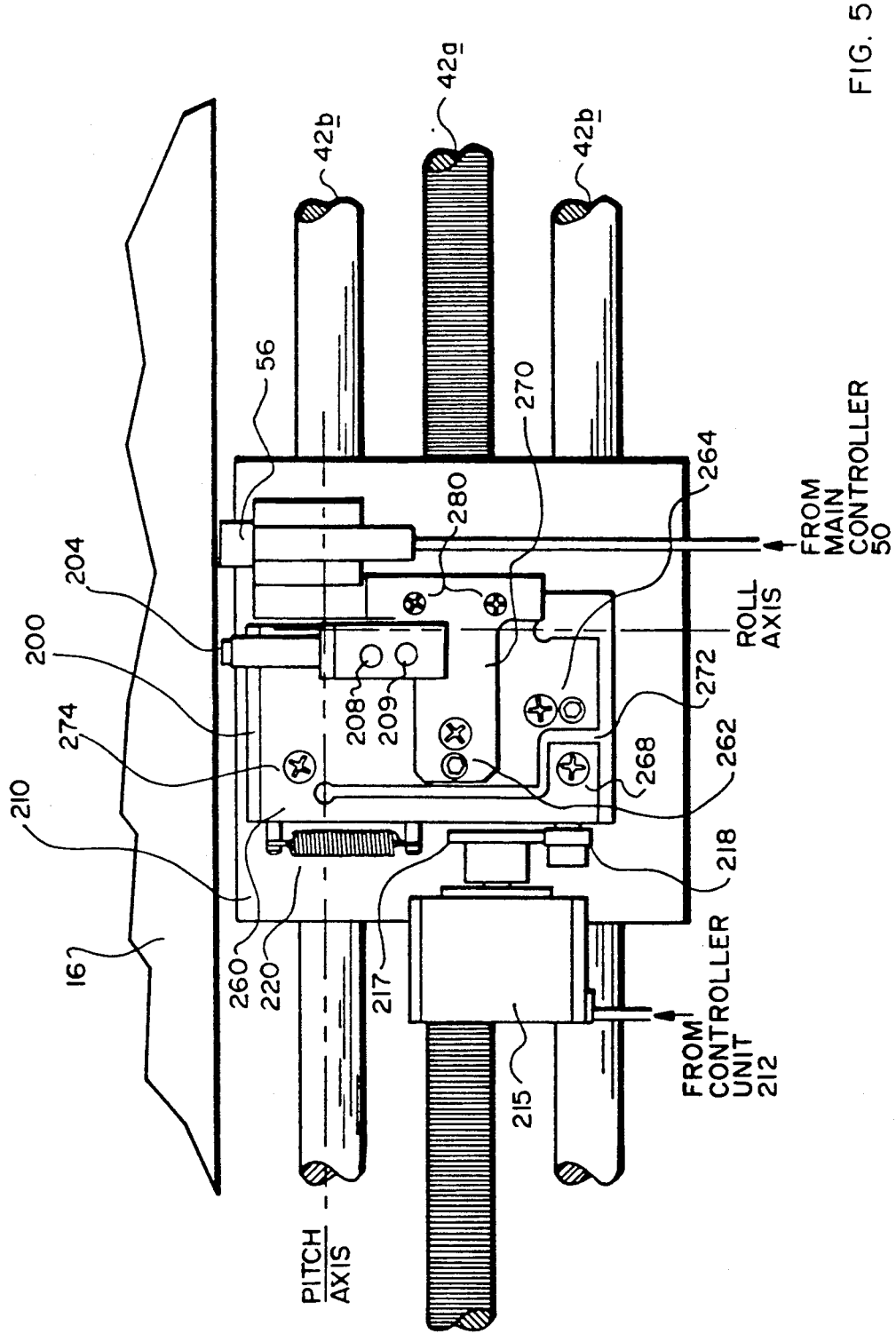
FIG. 5 is a plan view of the writing head and sensor assembly, which also shows pitch and roll adjustment components.

Refer now to FIG. 5. As shown therein, the actuator assembly consists of a stepper motor 215 having a track servo cam 217. A cam follower 218 is mounted on a slide 200 which moves toward and away from plate cylinder 16. The slide rests on stationary base support 210. (These components were omitted for clarity from FIG. 4A). In response to signals from controller unit 212, stepper motor 215 rotates cam 217 through a sufficient angular distance to displace cam follower 218, and hence slide 200 (to which are affixed writing head 56 and sensor head 204) the requisite linear distance. Slide 200 is normally urged toward plate cylinder 16 by spring 220, the other end of which is mounted to stationary base support 210.

Figure 7:
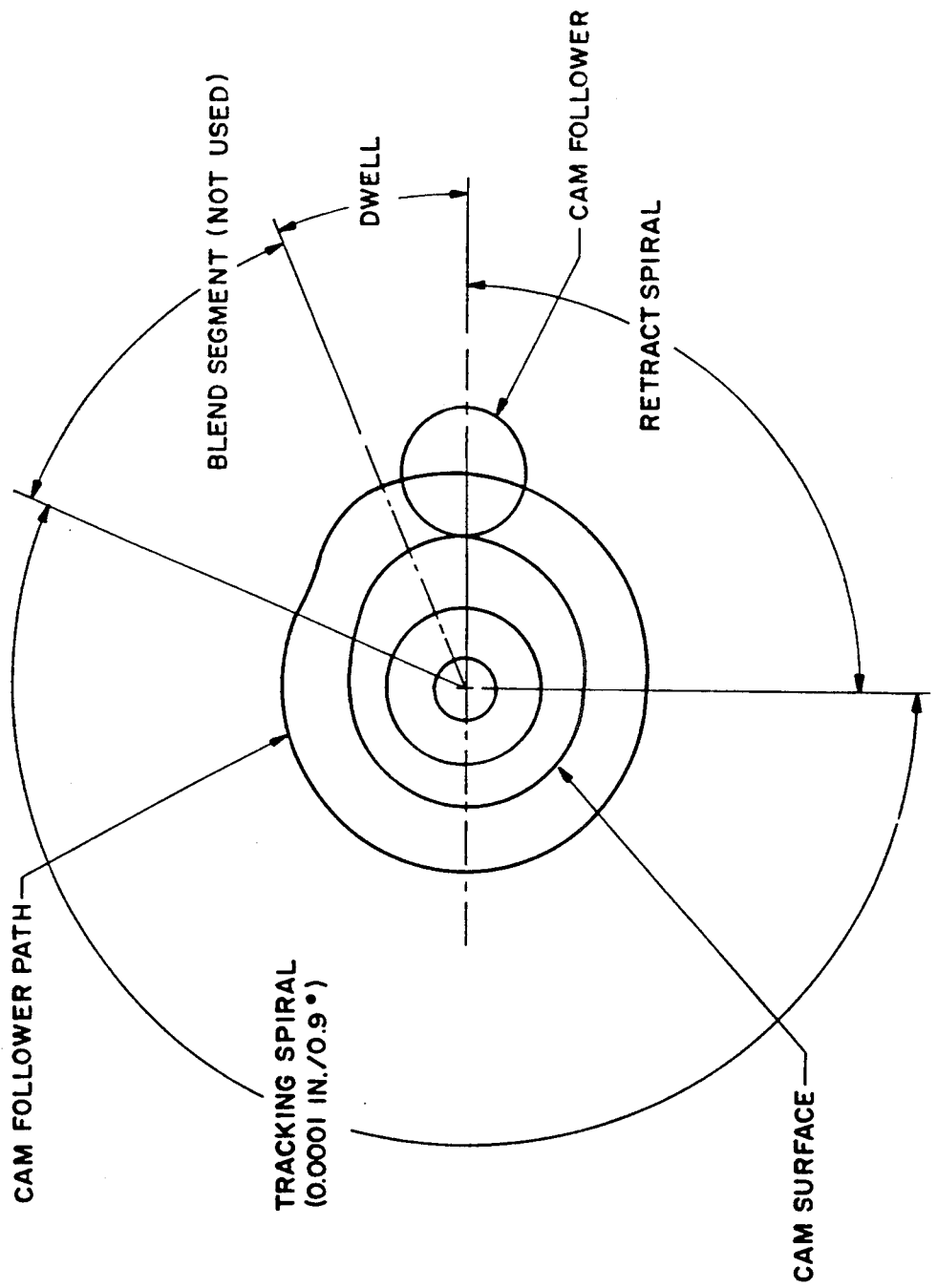
FIG. 7 illustrates the shape of an especially preferred cam, which is used to alter the position of the writing and sensor heads relative to the plate cylinder.

Preferably, the surface of cam 217 comprises two spiral segments and a dwell segment, and cam follower 218 is preferably a ball-bearing type follower. In the embodiment depicted in FIG. 5, the dwell segment represents the highest point of the cam, since rotation of the cam toward the dwell segment draws slide 200 away from plate cylinder 16. In an especially preferred embodiment, illustrated in FIG. 7, the first spiral segment occupies 90 degrees of the cam circumference; this segment is used to withdraw writing head 56 from impression cylinder 16 (i.e. to the dwell position) when the tracking system is inactive. In this embodiment, the second spiral surface, which occupies approximately 200 degrees of the cam circumference, has a radial increase of 0.0001 inch for each 0.9 degrees of cam rotation; stepper motor 215 is chosen such that each 0.9 degrees of cam rotation represents one half-step.

While the actuator assembly described above is a preferred embodiment, other means of actuation can be employed as well. Such means may include, for example, DC servomotors, pneumatic actuators, hydraulic actuators, voice coil actuators, and other systems that impart linear or rotary actuation motion.

Controller unit 212 preferably consists of an analog-to-digital (A/D) converter and standard microprocessor-based servo control circuitry. The computer program that directs the operations of controller unit 212 is stored in read-only memory (ROM) or other suitable permanent-storage device. An appropriate amount of random-access memory (RAM) is also provided to facilitate program execution. Controller unit 212 is programmed for three modes of operation: park, calibrate and track.

In the park mode, which is initiated both when the unit is activated and after a plate is imaged, cam 217 is rotated into the dwell position. When the top of the dwell segment is reached, a one-bit status flag (the "park flag") is set to its "on" state. The park mode is triggered by a signal from main system controller 50 (shown in FIG. 3).

Before printing is commenced on a newly mounted plate, a calibration operation must be performed to orient the tracking system. Calibration is initiated in response to a calibration signal provided by main controller 50; this signal is asserted when the unit is initially turned on, as part of the start-up sequence. Calibration will not start unless the park flag is set (thus providing assurance that writing head 56 has been withdrawn from plate surface 13), the park-signal no longer asserted (confirming that the start-up sequence has commenced), and plate cylinder 16 is positioned such that the plate-clamping area or "void" (denoted by reference numeral 12a) is not under sensor head 204.

The first step in the calibration sequence is movement of cam 217 along the second spiral surface until contact is made between electrode tip 58b and plate surface 13. The amount that cam 217 must be rotated to assure contact is determined during manufacture, and this value permanently stored within controller unit 212. In response to the calibration conditions described above, controller unit 212 issues to stepper motor 215 the signals necessary to obtain the contact position.

Next, writing head 56 is withdrawn slightly from plate surface 13 to establish a baseline value representing the closest allowable distance. This is accomplished by turning stepper motor 212 a step at a time until a pressure change is detected by sensor head 204, which indicates that electrode tip 58b is no longer in contact with plate surface 13. In order to allow for mechanical fluctuations and plate surface features, stepper motor 212 is turned an additional number of fixed steps, such that electrode tip 58b is further withdrawn from plate surface 13 but remains well within the useful operating range for spark-discharge recording.

Having established a baseline value, the control program then causes stepper motor 215 to turn in half-step increments. With each half-step, the reflected pressure signal produced by pressure transducer 214 is transmitted to analog-to-digital converter 216 and digitized. In order to enhance system accuracy, a number of pressure readings are taken and averaged. The averaged digital value is stored in a correlation table that relates a source-to-plate distance (which is permanently stored in ROM, having been calculated from the step size of stepper motor 215, the number of steps turned by the stepper motor, and the curvature of the second spiral surface of cam 217) to each successive digital value. The stepper motor is stepped, and additional values entered into the correlation table, over the entire useful etch-gap value range.

Upon receiving a tracking signal from main controller 50, controller unit 212 begins the track sequence. It is not necessary for tracking to begin at the calibration site. The track sequence begins with retrieval of a predetermined etch-gap index value, which reflects the preferred etch gap for the particular plate in use. The operator or main controller 50 can supply this value, depending on the degree to which the press or platemaker is automated. Controller unit 212 locates the entry in the correlation table closest to the etch-gap index, and actuates stepper motor 215 until the pressure reading corresponding to the distance closest to this etch-gap distance is reached. Alternatively, controller unit 212 can be configured to compare the current etch-gap distance (as determined by sensor 204) with the etch-gap index value, calculate the number of steps of stepper motor 215 necessary to reach the index value, and cause execution of such steps.

Spark-discharge recording then begins. A/D values are constantly acquired and averaged (approximately eight times per millisecond in the preferred embodiment), and the averaged values compared with entries in the correlation table created during calibration to verify that the etch-gap distance remains at the index value. Any deviation therefrom causes a comparison to be made between the observed pressure value and the value corresponding to the etch-gap index; the number of entries in the correlation table separating these two values then represents the number of steps necessary to correct the discrepancy. Alternatively, the observed pressure can be converted directly into its associated distance value, and this distance compared to the etch-gap index value. Any differential is then translated into a corresponding pressure difference, and sensor 204 moved until this pressure difference is achieved.

As hereinabove noted, main controller 50 maintains "awareness" of the instantaneous angular position of impression cylinder 50. When void 12a arrives at a position opposite electrode 58, main controller 50 provides a trigger signal to controller unit 212, which causes writing head 56 to be withdrawn a predetermined distance until the void section has passed. Main controller 50 similarly signals the end of void 12a and concomitant reappearance of imageable plate surface.

Referring now to FIG. 3, the writing head 56, and particularly the pulsing of its electrode 58, is controlled by a pulse circuit 96. One suitable circuit comprises a transformer 98, the secondary winding 98a of which is connected at one end by way of a variable resistor 102 to terminal 64a which, as noted previously, is connected electrically to electrode 58. The opposite end of winding 98a is connected to electrical ground. The transformer primary winding 98b is connected to a DC voltage source 104 that supplies a voltage in the order of 1000 volts. The transformer primary circuit includes a large capacitor 106 and a resistor 107 in series. The capacitor is maintained at full voltage by the resistor 107. An electronic switch 108 is connected in shunt with winding 98b and the capacitor. This switch is controlled by switching signals received from controller 50.

It should be understood that circuit 96 as specifically illustrated is only one of many known circuits that can be used to provide variable high-voltage pulses of short duration to electrode 58. For example, a high-voltage switch and a capacitor-regenerating resistor may be used to avoid the need for transformer 98. Also, a bias voltage may be applied to the electrode 58 to provide higher voltage output pulses to the electrode without requiring a high-voltage rating on the switch.

When an image is being written on plate 13, the press 10 is operated in a non-print or imaging mode with both the ink and water rollers 22a and 26b being disengaged from cylinder 12. The imaging of plate 13 in press 10 is controlled by controller 50 which, as noted previously, also controls the rotation of cylinder 12 and the scanning of the plate by carriage assembly 42. The signals for imaging plate 13 are applied to controller 50 by a conventional source of picture signals such as a disk reader 114. The controller 50 synchronizes the image data from disk reader 114 with the control signals that control rotation of plate cylinder 12 and movement of carriage 44 so that when the electrode 58 is positioned over uniformly spaced image points on the plate 13, switch 108 is either closed or not closed depending upon whether that particular point is to be written on or not written on.

If that point is not to be written on, i.e. it corresponds to a location in the background of the original document, the electrode is not pulsed and proceeds to the next image point. On the other hand, if that point in the plate does correspond to a location in the printed area of the original document, switch 108 is closed. The closing of that switch discharges capacitor 106 so that a precisely shaped, i.e. squarewave, high voltage pulse, i.e. 1000 volts, of only about one microsecond or less duration is . applied to transformer 98. The transformer applies a stepped up pulse of about 3000 (or more) volts to electrode 58, causing a spark discharge S between the electrode tip 58b and plate 13. That sparks and the accompanying corona field S' surrounding the spark zone etches or transforms the surface of the plate at the point thereon directly opposite the electrode tip 58b to render that point either receptive or non-receptive to ink, depending upon the type of surface on the plate.

Resistor 102 is adjusted for the different plate embodiments to produce a spark discharge that writes a clearly defined image spot on the plate surface which is in the order of 0.0001 to 0.005 inch in diameter. That resistor 102 may be varied manually or automatically via controller 50 to produce dots of variable size. Dot size may also be varied by varying the voltage and/or duration of the pulses that produce the spark discharges. Means for doing this are quite well known in the art. Likewise, dot size may be varied by repeated pulsing of the electrode at each image point, the number of pulses determining the dot size (pulse count modulation). If the electrode has a pointed end 58b as shown and the gap between tip 58b and the plate is made very small, i.e. 0.001 inch, the spark discharge is focused so that image spots of 0.001 inch diameter, more or less, can be formed while keeping voltage requirements to a minimum. The polarity of the voltage applied to the electrode may be positive or negative although preferably, the polarity is selected according to whether ions need to be pulled from or repelled to the plate surface to effect the desired surface transformations on the various plates to be described.

As the electrode 58 is scanned across the plate surface, it can be pulsed at a maximum rate of about 500,000 pulses/sec. However, a more typical rate is 25,000 pulses/sec. Thus, a broad range of dot densities can be achieved, e.g. 2,000 dots/inch to 50 dots/inch. The dots can be printed side-by-side or they may be made to overlap so that substantially 100% of the surface area of the plate can be imaged. Thus, in response to the incoming data, an image corresponding to the original document builds up on the plate surface constituted by the points or spots on the plate surface that have been etched or transformed by the spark discharge S, as compared with the areas of the plate surface that have not been so affected by the spark discharge.

In the case of axial scanning, then, after one revolution of plate cylinder 12, a complete image will have been applied to plate 13. The press 10 can then be operated in its printing mode by moving the ink roller 22a to its inking position shown in solid lines in FIG. 1, and, in the case of wet printing, by also shifting the water fountain roller 26b from its dotted line position shown in FIG. 1.. As the plate rotates, ink will adhere only to the image points written onto the plate that correspond to the printed portion of the original document. That ink image will then be transferred in the usual way via blanket cylinder 14 to the paper sheet P mounted to cylinder 16.

Forming the image on the plate 13 while the plate is on the cylinder 12 provides a number of advantages, the most important of which is the significant decrease in the preparation and set up time, particularly if the invention is incorporated into a multi-color press. Such a press includes a plurality of sections similar to press 10 described herein, one for each color being printed. Whereas normally the plate cylinders in the different press sections after the first are adjusted axially and in phase so that the different color images printed by the lithographic plates in the various press sections will appear in register on the printed copies, it is apparent from the foregoing that, since the images are applied to the plates 13 while they are mounted in the press sections, such print registration can be accomplished electronically in the present case.

More particularly, in a multicolor press, incorporating a plurality of press sections similar to press 10, the controller 50 would adjust the timings of the picture signals controlling the writing of the images at the second and subsequent printing sections to write the image on the lithographic plate 13 in each such station with an axial and/or angular offset that compensates for any misregistration with respect to the image on the first plate 13 in the press. In other words, instead of achieving such registration by repositioning the plate cylinders or plates, the registration errors are accounted for when writing the images on the plates. Thus once imaged, the plates will automatically print in perfect register on paper sheet P.

Although writing head 56 is depicted in FIG. 3 as consisting of a single electrode 58, such a simple configuration places significant limitations on the speed with which a plate can be imaged. One means of expanding the capabilities of the present invention is to use a writing head containing a plurality of imaging styli. The image data must then be divided into parallel rows of vertical points, in the case of circumferential scanning, or horizontal points in the case of axial scanning. Data from multiple rows are then simultaneously fed to all styli, each of which produces a single row of image dots. After the multiple-stylus head has made a complete revolution around (or axial traverse of) the impression cylinder, the head is moved to a position that is displaced from the original starting point by the number of rows that have already been imaged.

The most obvious configuration for a multiple-electrode arrangement would involve a single horizontal or vertical row of imaging electrodes. However, the proximity of each electrode to its neighbors is limited by the effect of simultaneous spark discharges. If the electrodes are spaced too closely, simultaneous arcing would cause unwanted interaction, resulting in deterioration of image quality. However, we have found that the effective distance between styli can be minimized by displacing the styli from one another in the direction of imaging, resulting in a diagonal row of styli. In the following discussion, we describe a multiple-stylus array that images vertically; in the preferred embodiment, this corresponds to the direction of plate cylinder 12 rotation. Although this configuration provides the simplest and fastest imaging means, since the impression cylinder can be rotated continuously and the writing head simply shifted, translated axially after each set of vertical rows is scanned, an analogous arrangement could be employed for imaging in the axial direction.

Figure 6A:
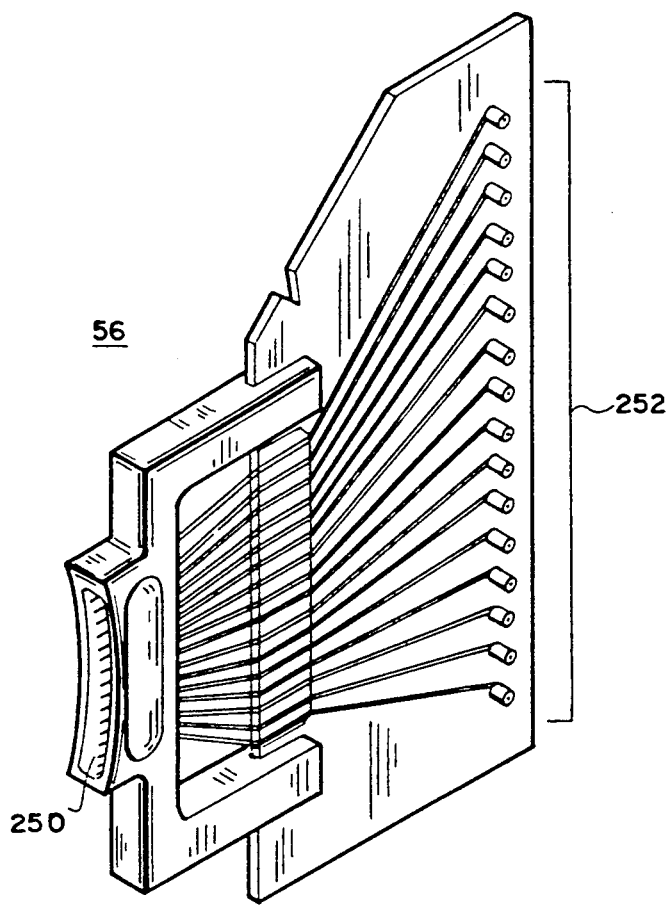
FIGS. 6A and 6B are isometric and enlarged front views, respectively, of a multiple-stylus writing head.

Reference numeral 56 in FIG. 6A denotes generally a suitable multiple-stylus writing head. The lead from each of the electrodes (designated collectively by reference numeral 250) is directed to a contact along array 252. Each contact ultimately connects to main controller 50, which can either receive image data already arranged into vertical rows, or can be adapted for sampling the contents of a memory buffer containing a complete bitmap representation of the image and transmitting appropriate signals to each electrode as it traverses positions along the impression cylinder corresponding to bitmap points.

Figure 6B:
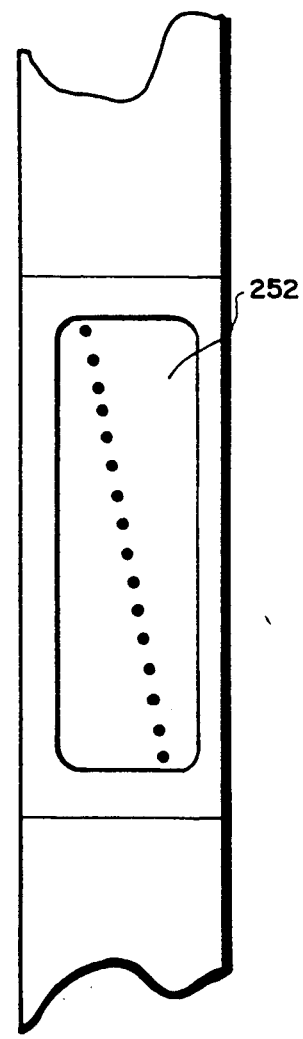

A front view of electrode array 252 is shown in FIG. 6B. The electrodes must be spaced far enough from one another to prevent arcing therebetween. We have obtained good results when the electrodes are spaced approximately 0.05 inch away from one another, but a range of interelectrode distances will satisfy the foregoing criterion. Thus, in order to maintain the electrodes at a horizontal distance of about 0.001 inch from one another, the vertical pitch in our preferred embodiment is 0.05 inch.

After each revolution of the plate cylinder, the array is advanced along the cylinder's axis by a distance equal to the product of the number of wires in the array and the axial pitch between the wires.

In some situations, imaging speed can be enhanced even further by use of a plurality of multiple-stylus writing heads. However, such arrangements cannot ordinarily be used for single composite images. Not only are the unimaged strips that result from the gap between adjoining heads cumbersome to scan, but these strips can become electrically isolated from the remainder of the plate; electrical isolation prevents maintenance of the ground necessary for imaging. Thus, more than one multiple-stylus head may be employed to print in strips (such as would be useful for printing labels or tickets) where adjacent imaged areas do not overlap, and a non-imaged space remains between adjacent imaging areas.

The length of each electrode is determined by its position within array 252 and the curvature of plate cylinder 16. Array 252 forms an arc which aligns with the plate surface. The linear dimension of each electrode must be controlled precisely during assembly because, as has been stressed hereinabove, the gap between the electrode tip and the plate surface is critical.

By themselves, properly measured electrode tips do not furnish the necessary alignment of array 252 with plate cylinder 16. The entire writing head 56 must align circumferentially with the curvature of the plate cylinder 16 in order to maintain a constant etch gap. In addition, the plane of array 252 must remain at the "correct" angle with respect to the axis of plate cylinder 12, both to prevent adjacent passes over the plate surface from overlapping or leaving a perceptible gap therebetween, and to maintain the desired horizontal pitch between the electrodes. In this context, the "correct" angle means the deviation of the plane of the array of electrodes from a plane perpendicular to the axis of plate cylinder 16, denoted as $\Theta$ in FIG. 6B, such that the body of writing head 56 is substantially perpendicular to said axis.

We have developed a pitch-and-roll adjustment assembly, shown in FIG. 5, for use with the present invention that facilitates fine adjustment of the position of writing head 56 along two axes. This assembly consists of an advantageously configured flexure plate and associated mounting components.

As shown in FIG. 5, flexure plate 260 is secured to base support 210 by means of screws 268 and 274. To flexure plate 260 is attached writing head support 270, which serves as the base for writing head 56. Flexure plate 260 is formed from a single metal plate and is fabricated with grooves extending substantially more than halfway through its thickness. These grooves run in directions parallel and perpendicular to impression cylinder 16, and allow the plate to bend in a predictable fashion, through a limited arc, about the roll and pitch axis without deformation. Jack screws 262 and 264 are used to set and maintain the desired roll and pitch, respectively.

Flexure along the pitch axis, which is facilitated by at least one groove in flexure plate 260 extending along the pitch axis, controls the pitch angle of writing head 56 so as to align it with the plate cylinder 16 surface. A high degree of stiffness is maintained along all other directions. Positioning the flexure plate about the pitch axis is accomplished by means of pitch adjustment screw 264, which is threaded through flexure plate 260 and tracking slide 200 to which it is mounted by attaching screws 268 and 274.

In order to enhance the fineness of pitch adjustment, adjustment screw 264 can be provided with two threaded portions on two different diameters along its length. The screw pitch on the smaller-diameter portion is finer than that on the larger-diameter portion. One portion is threaded into the tracking slide 200 and the other portion is threaded into flexure plate 260. As adjustment screw 264 is turned into flexure plate 260, the finer pitch advances less then the coarse pitch, such that flexure plate 260 is spread from tracking slide 200 but by a lesser amount than the pitch advance of either screw portion.

Writing head 56 is secured to image head support 270, which is mounted to flexure plate 260 by attaching screws 280. Roll is facilitated by flexure across at least one groove in flexure plate 260 extending along the roll axis. The degree of roll is controlled by means of roll adjustment screw 262, which is threaded through image head support 270 and the flexure plate 260. As adjustment screw 262 is turned, the angle of image head support 270 with respect to the plate cylinder axis is altered, thereby causing writing head 56 to rotate along the roll axis. Furthermore, the fineness of roll adjustment can be enhanced by use of two. threaded portions differing in pitch along roll adjustment screw 262, as described above in connection with pitch adjustment screw 264. In a multiple-stylus configuration, the roll action alters the angle of the array with respect to plate cylinder 16, thereby varying the effective distance between electrodes as presented to plate cylinder 16.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. For example, although we believe that the preferred embodiment of our tracking system offers a highly advantageous solution to all of the constraints associated with spark-discharge imaging, it may be possible to adapt alternative sensing technologies for use with our imaging system. Such alternative technologies might include proximity monitoring based on capacitance, optical, eddy-current or magnetic characteristics.

What is claimed is:

1. Apparatus for imaging a lithographic printing plate, the apparatus comprising:
   a. means for supporting a lithographic printing plate;
   b. a discharge source including an electrode;
   c. means for positioning the discharge source close to the plate surface, comprising:
      i. a pneumatic position sensor in fixed alignment with the discharge source, which sensor comprises:
         a) air-discharge means for emitting a regulated flow of air toward the plate;
         b) sensor means proximate to the air-discharge means, for responding to pressure reflected from the plate surface;
         c) signal-generation means for generating a signal representative of the reflected pressure and whose magnitude indicates the distance between the discharge source and the plate surface; and
      ii. feedback control means in fixed alignment with the discharge source and position sensor, the control means being adapted for moving a subassembly comprising the position sensor and discharge source with respect to but without making contact with the plate surface and also with respect to the control means, thereby altering the position of the position sensor and recording head with respect to the plate surface in response to the magnitude of the signal so as to maintain a relatively constant distance between the discharge source and the plate surface;
   d. means for moving the discharge source and the plate relative to one another so that the discharge source scans over the surface of the plate; and
   e. means for causing the discharge source to produce, at selected points during scanning, spatial discharges between the discharge source and the plate that change the affinity of the plate surface for water and/or ink at such points, thereby producing image spots on the plate.

2. The apparatus of claim 1 wherein the control means comprises:
   a. stepper motor whose position remains fixed with respect to the subassembly;
   b. a cam rotatably mounted to the stepper motor;
   c. a cam follower operatively connected to the subassembly such that movement thereof produces a corresponding movement of the discharge source with respect to the printing plate, but without making contact with the printing plate; and
   d. means for urging the subassembly toward the printing plate.

3. The tracking system of claim 2 wherein the cam comprises a dwell segment and at least one spiral segment.

* * * * *